United States Patent
Borel et al.

[11] 4,036,553
[45] July 19, 1977

[54] METHOD OF CONTROLLING AN OPTICAL CHARACTERISTIC

[75] Inventors: Joseph Borel, Echirolles; Jean-Claude Deutsch, Grenoble; Guy Labrunie, Seyssinet; Jacques Robert, St-Egreve, all of France

[73] Assignee: Commissariat a l'Energie Atomique, Paris, France

[21] Appl. No.: 554,987

[22] Filed: Mar. 3, 1975

Related U.S. Application Data

[62] Division of Ser. No. 392,324, Aug. 28, 1973, abandoned.

[30] Foreign Application Priority Data

Aug. 29, 1972 France .................. 72.30685
July 17, 1973 France .................. 73.26109

[51] Int. Cl.$^2$ ........................................ G02F 1/16
[52] U.S. Cl. .................. 350/160 LC; 340/336; 340/324 M
[58] Field of Search .......... 350/160 LC; 340/336, 340/324 M

[56] References Cited
PUBLICATIONS

Lechner et al., "Liquid Crystal Matrix Displays", Proceedings of the IEEE, vol. 59, Nov. 1971, pp. 1566–1579.
Gooch, C. H., Low, J. S., "Matrix—addressed Liquid Crystal Displays", J. Phys. D. Appl. Phys., vol. 5, 1972, pp. 1218–1225.
Kmetz, A. R., "Experimental Comparison of Multiplexing Techniques for LC Displays", 1972, SID International Symposium, June 1972, pp. 66–67.
Soref, R. A. and Rafuse M. J. "Electrically controlled Birefringence of Thin Nematic Films," Jour. of Appl. Phys. No. 143, No. 5, May 1972, pp. 2029–2037.
Kahn, F. J., "Electric-Field-Induced Orientational Deformation . . . .," Appl. Phys. Lett., vol. 20, No. 5, Mar. 1972, pp. 199–201.
Schiekel, M. F., Fahrenshon K., "Deformation of Nematic Liquid Crystal with Vertical . . . .," Appl. Phys. Lett., vol. 19, No. 10, Nov. 15, 1971, pp. 391–393.
Robert, J., Labrunie G., Borel, J. "Imageus de Phase Electro-Optique á Cristaux Liquides Mematiques," 1st European Elctro Optics Markets & Tech. Conf. 1973.

*Primary Examiner*—John K. Corbin
*Assistant Examiner*—Rolf Hille
*Attorney, Agent, or Firm*—Cameron, Kerkam, Sutton, Stowell & Stowell

[57] ABSTRACT

The invention relates to a method of controlling an optical characteristic of a material and it is concerned also with devices and image-forming means for carrying out the method.

The method of control is particularly advantageous in devices comprising a plurality of points distributed in the form of a matrix. The optical characteristic K of the material is controlled by an energization having a magnitude G for a duration $t$, the values G and $t$ being so selected as a function of the time response K (G, $t$) of the characteristic K at an energization stage of magnitude G that K ($G_0$, $t_0$) is equal to $K_0$.

2 Claims, 11 Drawing Figures

METHOD OF CONTROLLING AN OPTICAL CHARACTERISTIC

This is a division, of application Ser. No. 392,324, filed Aug. 28, 1973, now abandoned.

The invention relates to a method of controlling an optical characteristic of a material and also to devices and image-forming means for performing said method. The invention applies inter alia to the rapid control of display devices.

More precisely, the invention relates to a method of controlling an optical characteristic K of a material to a value $K_O$ by means of an energization of magnitude G, characterized in that the material is subjected to an energization of magnitude $G_O$ for a duration $t_O$, the pair of values $G_O$ $t_O$ being so selected as a function of the time response K (G, t) of the characteristic K at an energization stage of magnitude G that K ($G_O$, $t_O$) is equal to $K_O$.

The value of the characteristic K can be caused to vary around a value $K_O$ either by acting on the duration $t_O$, while keeping $G_O$ fixed, or by acting on $G_O$, while keeping the duration $t_O$ fixed.

This method of control is more particularly advantageous in devices comprising a plurality of points distributed in the form of a matrix, since the sensitization of a point in the structure of that kind may lead to a parasitic sensitization of the adjacent points. The method according to the invention enables the energization to be so controlled that there is not enough time for the sensitization of the adjacent points to become established, although at the same time the rapidity of control at the selected point is maintained.

The invention therefore also relates to a method for controlling one of the points of a layer of material comprising a plurality of points, the energization of one point by $G_O$ causing the appearance of an energization $G'_O < G_O$ at the adjacent points characterized in that such point is subjected to an energization of magnitude $G_O$ for a duration $t_O$, and the pair $G_O$, $t_O$ are so selected that K ($G_O$, $t_O$) is equal to $K_O$ and K ($G'_O$, $t_O$) differs only slightly from K (O, t).

The method according to the invention applies to any material an optical characteristic of which can be modified using any energization. The energization can be of an electric, magnetic, thermal, or electronic nature.

The material can be an amorphous body or a solid or liquid crystal. The optical characteristic can be an opacity, a refractive index, a transparency, an absorption, a diffusion, a diffraction, a convergence, a rotary power, a birefringency, or a light intensity reflected in a predetermined solid angle.

The invention also relates to an apparatus for performing the method defined hereinbefore. According to this aspect of the invention there is provided an image-forming means comprising a plurality of points of energization in a material an optical characteristic K of which can be controlled by an energization G, the time response of the characteristic K at the energization stage of magnitude G having the reference K (G, t); energizing means; an address device connecting said means to each of said points, and is characterized in that the energizing means comprise means for delivering an energization $G_O$ of controllable amplitude for a controllable duration $t_O$, where K ($G_O$, $t_O$) represents the required value of K at said point.

Merely by way of explanation, without limiting the invention to such details, a description hereinafter will be given of three embodiments of devices of the kind specified: the first embodiment relates to a solid material whose light absorption depends on the temperature of the material; the second embodiment relates to a resilient diaphragm whose light intensity which it reflects in a predetermined solid angle depends on its deformation under the action of a force, inter alia of electrostatic origin; the third embodiment relates to liquid crystal image-forming means. The features and advantages of the method according to the invention will be better understood from the description of these three embodiments.

The following description refers to the drawings, wherein.

Figure 1:
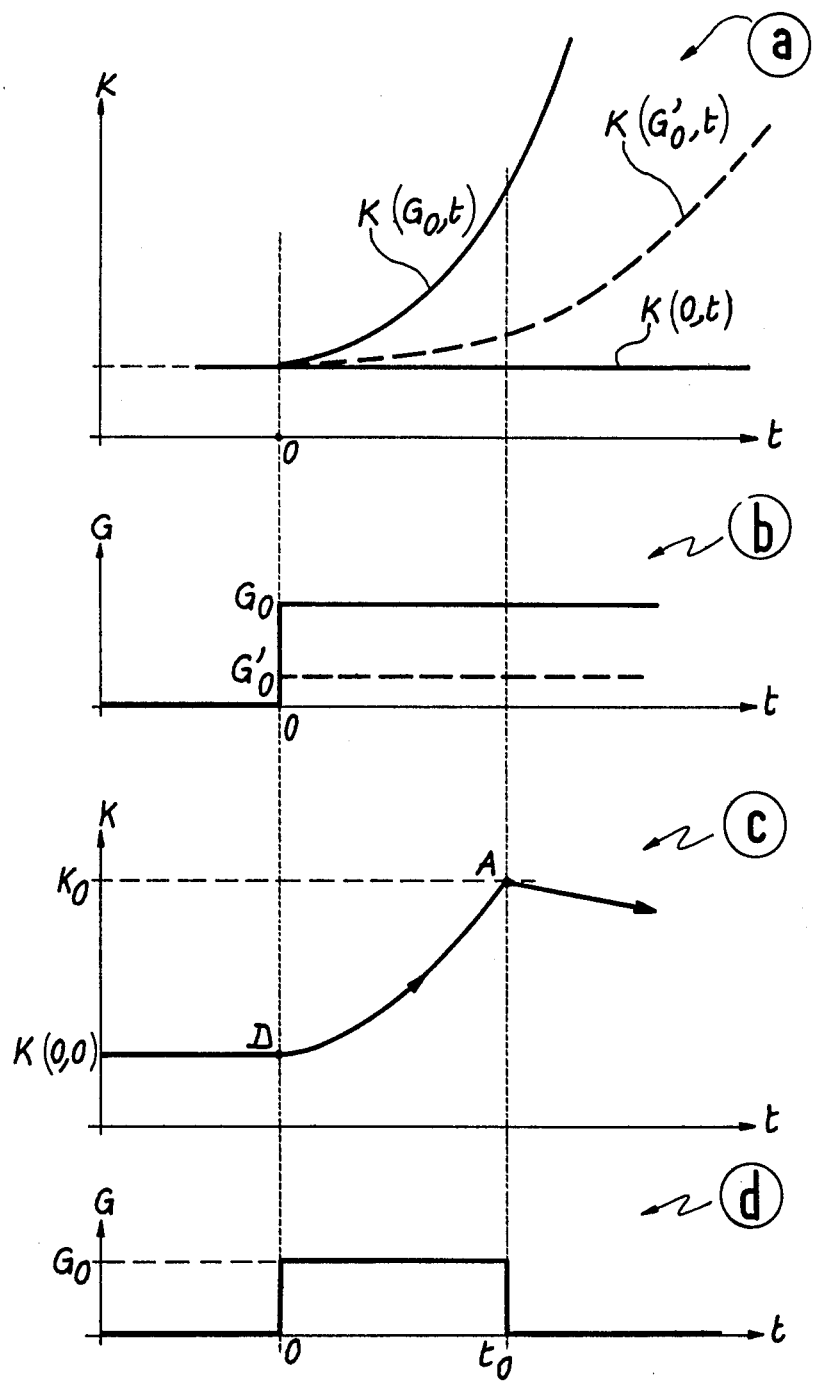
FIG. 1a is a graph illustrating the time response for an optical characteristic K at energization stages of magnitude $G_O$ and $G'_O$ shown in FIG. 1b.
FIG. 1c is a graph illustrating the control of the characteristic K at the value $K_O$ by an energizing pulse of duration $t_O$ and magnitude $G_O$ illustrated in FIG. 1d.

Instead of applying low energizations and waiting for the characteristic K to reach its limit value, as in the prior art, according to the invention a high energization is applied for a limited time, taking into account the time response of the characteristic K at a stage of energization as shown in FIG. 1. FIG. 1a shows the time response K ($G_O$ t) of the characteristic K of the material used at a stage of energization of magnitude $G_O$ as shown in FIG. 1b. FIG. 1a also shows the response K ($G'_O$, $t_O$) of the characteristic K at a stage of energization of magnitude $G'_O$ shown in FIG. 1b with $G'_O < G_O$.

According to the invention, therefore, this time response is used and the pair of values $G_O$, $t_O$ is so controlled that K ($G_O$, $t_O$) is equal to the required value $K_O$, as shown in FIGS. 1c and 1d. In FIGS. 1c and 1d, at the time $t = 0$, the characteristic K has the value of K (O, O) corresponding to the departure point D and, at the end of a period $t_O$ of energization of magnitude $G_O$, the characteristic K assumes the value $K_O$, corresponding to the arrival point A. Beyond the time $t_O$, the characteristic K resumes its initial value K (O, O) with a relaxation time which varies in dependence on cases, and which may moreover be utilized in sequential control devices, as will be described hereinafter.

Figure 2:
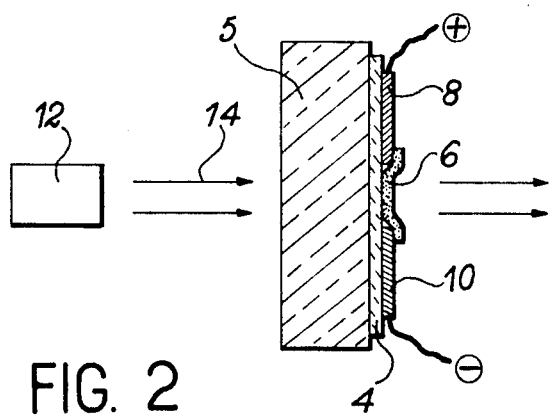
FIG. 2 shows an element in which the optical characteristic which can be controlled by the process according to the invention is the absorption of light, and in which the energization is a heating produced by Joule effect.

FIG. 2 illustrates diagrammatically an element in which the optical characteristic which can be controlled is the absorption of light and in which the energization is a heating. The element comprises a layer of material 4 deposited on a transparent support 5, for example of quartz: the material 4 can be cadmium sulphide Cds in crystalline form; a transparent electrode 6 bears against metal contacts 8, 10 connected to means (not shown) for applying an electric voltage for a predetermined duration. The structure is completed by a light source 12 delivering a beam 14, which reaches the crystal 4 where it is partially absorbed. Some crystals, for example cadmium sulphide, have an absorption band whose front can be displaced by thermal effect. For instance, in a thickness of 15 $\mu$ cadmium sulphide is transparent at a temperature of 0° C to a radiation of wavelength 5145 A (radiation emitted by an ionized argon laser) and may be completely absorbent of such radiation at a temperature of 70° C. In the case of the element illustrated in FIG. 2, the heating is produced by a flow of electric current through conductors 8, 6, 10.

In the method according to the invention, to control the absorption of the crystal 4 at a predetermined value, the crystal is so subjected to a thermal energization of suitable value and duration that, as a result of the supposedly known time response of the material, the required absorption is achieved at the end of said duration. The absorption can be to any degree, being theoretically between 0 and 1. As a result, at the output of the element a light intensity is obtained which is a continuously adjusted analog function of the energization.

Figure 3:
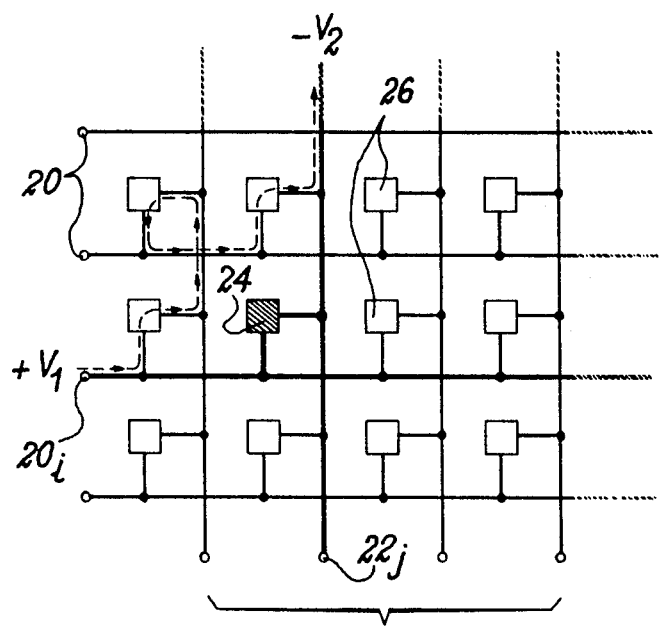
FIG. 3 is a diagram of a matrix device formed by a plurality of points similar to that shown in FIG. 2, illustrating the method of controlling one point without energizing the adjacent points.

As stated hereinbefore, the control process according to the invention is particularly suitable for rapidly sensitizing the points of a device comprising a plurality of points. One example of a device of this kind is shown in FIG. 3. It comprises a first system of horizontal connections 20 and a second system of vertical connections 22, which allow the sensitization of the elements represented by squares at the intersection of said lines. To sensitize a point of coordinates $i$ and $j$, a voltage $+V_1$ can be applied to the horizontal connection $20_i$, and voltage $-V_2$ can be applied to the vertical connection $22_j$. In this way an electric power which is a function of the voltage $V_1 + V_2$ is applied to the point 24 to be sensitized. However, the application of the voltages $V_1$ and $-V_2$ causes a current to appear in the elements adjacent the point 24, this current following a path of varying complexity, one path being shown in chain lines in FIG. 3. The elements adjacent to the point 24 are therefore also partly energized.

According to the invention, control voltages and the duration $t_O$ are so selected that the thermal energization at the point 24 to be sensitized (causing the appearance of weaker stray energizations at the adjacent points) is adequate for the displacement of the absorption band to be treated as regards the point 24 on completion of the period $t_O$, but also that at the neighbouring points, subjected to a weaker heating, there is an absorption which differs only very little from the absorption before heating.

Further reference to FIGS. 1a and 1b will show in general the situation of the curve K ($G'_O$, $t_O$) in relation to the curve K ($G_O$, $t_O$), and it will be found that this result can be obtained.

In this way, by acting on the kinetics of the energization, if necessary a considerable voltage can be applied to the point to be sensitized to increase the control speed.

Moreover, in the prior art devices of the kind specified, diodes have to be provided to block stray currents. The device illustrated in FIG. 3 is therefore simplified in comparison with similar prior art devices, and it gives a higher performance.

Figure 4:
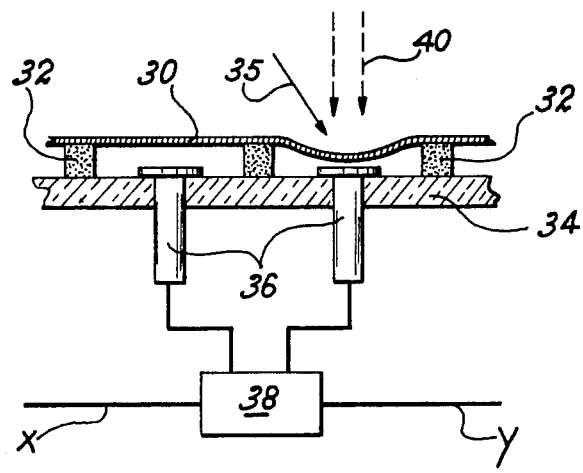
FIG. 4 shows an element for which the optical characteristic which can be controlled by the method according to the invention is the diffusion of light by a deformable diaphragm, the energization being an electrostatic force.

FIG. 4 illustrates by way of explanation another example of controlling the optical characteristic of a material, in which the characteristic is the intensity of the light reflected by a deformable diaphragm, the energization being an electrostatic force. The element comprises mainly a flexible diaphragm 30, for instance, a nickel diaphragm a few microns thick; an insulating structure formed by wedges of thickness 32 between the diaphragm 30 and an insulating support 34; conductive studs 36 disposed in the support 34 and connected to an address device comprising an integrated circuit 38 controlled by connections X and Y.

By the play of electrostatic forces, application of charges to one of the studs 36 deforms the diaphragm 30 opposite the corresponding stud (the righthand stud is energized as viewed in FIG. 4). In another variant, the loads can be applied by an electron beam 35, in which case there is no structure comprising studs 36 and integrated circuit 38.

A beam of light 40 impinges on the diaphragm and is diffused by the deformed zones. For an illustration of prior art control of a device of the kind specified, reference can be made to the article "A membrane page composer" published in the RCA Review, March 1973.

According to the invention, said element is controlled by applying to the suitable studs 36 an electric voltage whose amplitude and duration take into account the time response of the reflection of light by the diaphragm when it is deformed by an electrostatic force.

In the case of an image-forming means formed by a plurality of said points, the procedure will be as described hereinbefore, applying to the point to be sensitized an electrostatic force of magnitude such that the stray force which may be exerted on the adjacent points is inadequate to cause appreciable deformation at said points.

Figure 5:
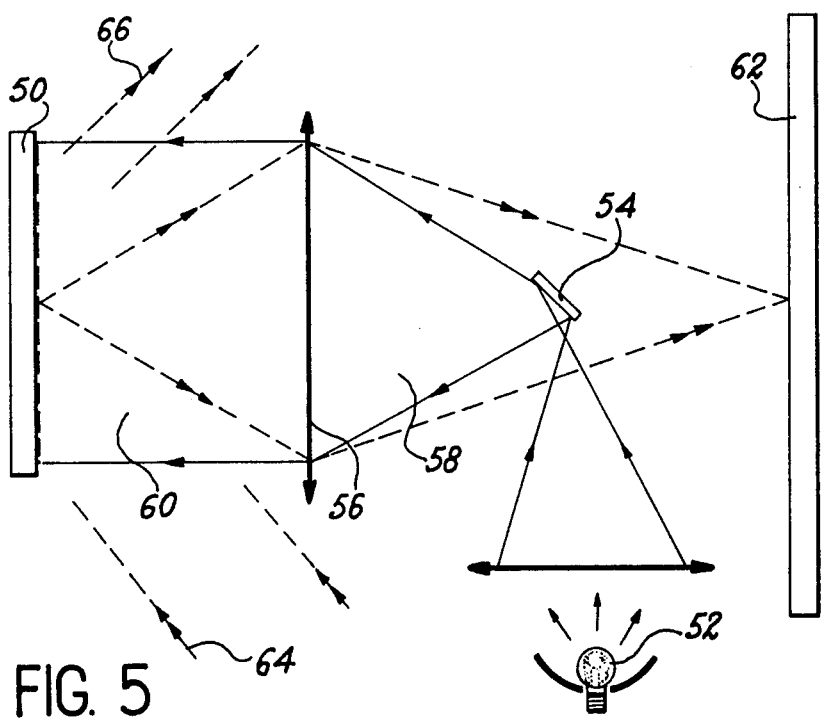
FIG. 5 shows an example of the application of a device comprising a plurality of elements, such as those shown in FIG. 3, to the projection of an image on a large screen.

FIG. 5 shows a projection system comprising: a device 50 formed by a plurality of energizable points as shown in FIG. 4, a light source 52, a mirror 54 at 45°, a lens 56 producing from the incident beam of light 58 a parallel beam 60. The characteristics of the lens 56 are such that the image of the surface of the device 50 is disposed on a large screen 62. The mirror 54 returns the light emitted by the source 52 to the device 50 and also acts as a spatial filter stopping reflected or weakly focused light.

In a more simple variant, a beam of light 64 lights up the device 50 at an oblique incidence and only the light sent clearly outside the specular reflection 66 is collected by the lens 56 to form the image on the screen 62.

Another family of devices for carrying into effect the method according to the invention will now be described, relating to liquid crystal cells energized by an electric field.

The action of an electric field on a liquid crystal can produce two different effects, in dependence on the conditions of use:

1. The electric field enables ions to be injected into the liquid crystal; the ions in transit from one electrode to another shear the liquid and give it a cellular eddying movement, which produces a possibility of light diffusion; in the English language Literature the effect is known as the "dynamic scatting mode". In transmission this diffusion causes an opacity in the liquid crystal film. Under these conditions, the voltage applied must be a low frequency (below 100 Hz) direct or alternating voltage. The transitory response of the liquid crystal when an electricl field stage E is applied to it has a rise period which varies as $1/E$ or $1/E^2$ and a time of decrease after the energization ceases which is a function of the viscosity of the liquid.

2. In a different phenomenon, the electric field applied to a liquid crystal causes the collective orientation of its molecules by acting on their dipolar force. To maintain this ordered state, there must be no disturbance in the liquid and transit of ions; moreover, in this instance, the control voltage must be alternating and have a frequency higher than the relaxation frequency of the charges in the liquid (a frequency very much higher than 100 Hz) or undergo variations of any kind, on condition that their mean value is zero. If we consider a liquid crystal having a dipolar force perpendicular to the major axis of the molecule, in the absence of an applied electric field the initial orientation of the molecules is normal to the walls of the cell. The electric field tends to align the dipolar forces in its direction and to lay the molecules on the walls; the optical axis can therefore rotate through 90° under the force of the electric field, and this causes a variation in the index of the medium. The transitory response of such variation in index, when an alternating voltage stage is applied, has a time of rise inversely proportional to the square of the electric field. The time of decrease of the index after the electric energization has ceased is proportional to the square of the thickness of the liquid crystal layer.

For these two effects, the curves giving opacity as a function of the voltage applied (diffusion effect) or the variation in index as a function of the effective voltage applied (orientation effect) have very similar shapes, the effect appearing only when the voltage applied is higher than a threshold voltage. A voltage slightly greater than the threshold voltage must be applied if a value of opacity or index is to be obtained which lies between the minimum and maximum values. For such voltages the times of rise of the optical characteristic which is to be controlled is then long, for instance, about 20 milliseconds, and this eliminates certain applications which require a rapid control of such optical characteristic. If necessary, this rapidity can be obtained if we content ourselves with obtaining the maximum value, for instance of opacity, by applying a voltage much higher than the threshold voltage. However, this procedure does not therefore allow the control, with an optimum response time, of the selected optical characteristic at a value lying between the minimum and maximum. Moreover, the procedure is inapplicable to liquid crystal cells whose systems of electrodes are of the crossed strip type, even if they operate at two levels (minimum and maximum) of an optical characteristic, since it is shown that in static or quasi-static conditions the voltage applied at a point to be sensitized must not exceed three times the threshold voltage if the sensitization of the adjacent points is also to be avoided.

Figure 6:
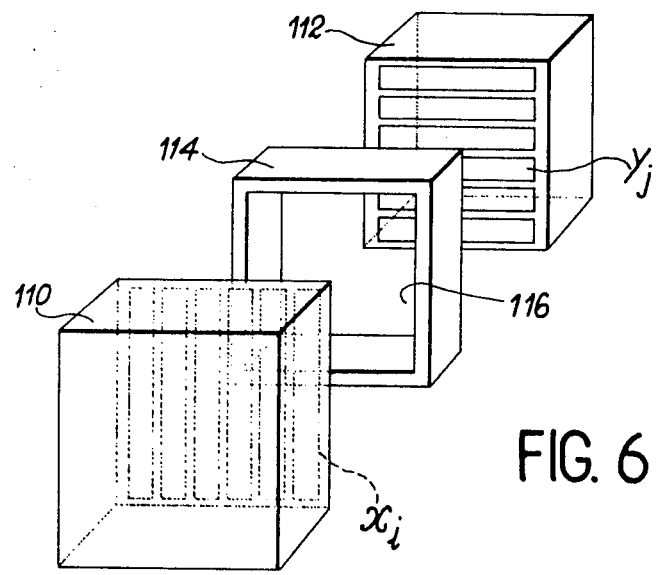
FIG. 6 is an exploded perspective view of a liquid crystal cell using crossed strip electrodes.

FIG. 6 is an exploded perspective view of a cell of the kind specified. It comprises two transparent walls 110, 112 disposed on either side of a wedge of thickness 114 of insulating material defining a volume 116 occupied, when the cell is mounted, by the liquid crystal film; disposed on each of the walls 110, 112 are two systems of electrodes each formed by a series of parallel semitransparent conductive strips, having the reference $x_i$ in the case of one of the systems and the reference $y_j$ in the case of the other. The useful surface of the liquid crystal is thus decomposed into a plurality of "points" corresponding to the overlapping zones of the two systems of electrodes, and each point can be defined by the intersection of two strips $x_i$ and $y_j$. The sensitization of a point, or, if preferred, the control of an optical characteristic of the liquid crystal contained in the zone corresponding to such point, is performed by applying to the appropriate electrodes electric voltages which cause the appearance of an electric field in the liquid crystal at that point. An image can therefore be caused to appear by defining it point by point. The image can also be formed by sensitizing the various points one after the other; to this end, the phenomenon which is used must have a time of decrease adequate for the information present at a sensitized point to be maintained during the scanning cycle of all the points in the cell.

To describe the method according to the invention merely by way of explanation, we shall take the case of controlling the optical index $n$ of a liquid crystal, the liquid crystal taken as an example being methoxy benzylidene butyl aniline (referred to hereinafter as MBBA), which is of the nematic type.

The MBBA molecule has an electric dipolar force perpendicular to its major axis. In the absence of an applied electric field, the walls of the cell containing the liquid crystal (for instance, the walls 110, 112 of the cell shown in FIG. 6) are so treated that the molecules are perpendicular to said walls. The application of an electric field to the liquid crystal modified the orientation of the bipolar force and lays the molecules parallel with the electrodes. This collective orientation of the molecules induces a birefringency $\Delta n$. In the case of MBBa, for instance, for an applied electric field of 200 kV/cm, the time of rise of birefringency is of the order of 50 microseconds and the time of decrease is of the order of 50 milliseconds for a liquid crystal film thickness of 10$\mu$.

Figure 7:
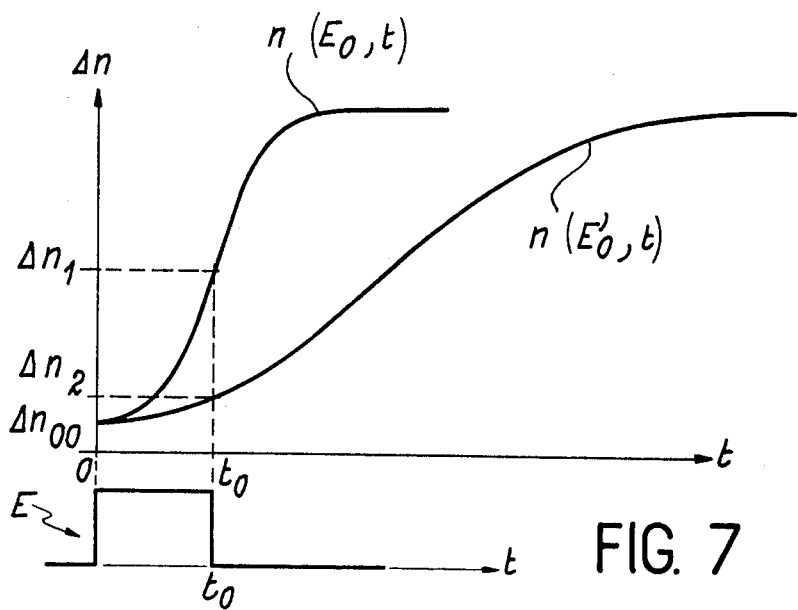
FIG. 7 is a graph illustrating the transitory response of the index of liquid crystal subjected to a pulse of an electric field.

The transistory response of the variation in index $\Delta n$ is illustrated in FIG. 7, which shows two curves $n$ ($E_o$, $t$) and $n$ ($E'_o$, $t$) representing the variations in the index as a function of time for two values $E_o$ and $E'_o$ of the effective electric field, with $E'_o < E_o$. For low values of $\Delta n$, the development of the index can be expressed analytically by the following formula:

$$\Delta n/n_o = [(n_e^2 - n_o^2) / 2n_o^2]\phi_o^2 \cdot \exp(2 t/T_1) \qquad (1)$$

where
 $n_o$: ordinary index of the liquid crystal,
 $n_e$: extraordinary index of the liquid crystal,
 $\phi_o$: mean quadratic angular value of the orientation of the molecules due to thermal agitation, $$1/T_1 = \left(\frac{\epsilon_0 E^2}{4\pi} - \frac{K_{33}\pi^2}{d^2}\right)/\gamma_1$$

where
- $\gamma_1$: coefficient of viscosity of the liquid crystal,
- $\epsilon_\theta$: dielectric anistropy of the liquid crystal,
- $K_{33}$: elastic constant of the liquid crystal,
- $d$: thickness of the liquid crystal layer,
- $E$: electric field applied.

In the majority of cases the electric field applied is large enough to enable the term $K_{33}\pi^2/d^2$ in front of the term $\epsilon_\theta E^2/4\pi$ to be ignored, so that the equation giving the development of deviation of index $\Delta n$ in the course of time has substantially the following shape:

$$\Delta n = \Delta n_\infty \exp (2\epsilon_\theta E^2 t/4\pi v_1) \, tm \quad (2)$$

where $\Delta n_\infty$ is the value of the variation in index corresponding to the thermal agitation.

In the method according to the invention, applied to liquid crystals, as shown diagrammatically in FIG. 7, the or each point to be energized receives an electric field of intensity $E_o$ for the duration $t_O$; the variation in index then reaches the value $\Delta n_1$. The adjacent points which must not be energized can receive, due to the construction of the cell, a field of intensity $E'_o$ during the same time $t_O$, producing at such points a variation in index of $\Delta n_2$. According to the invention on the one hand the pair of values $E_o$ and $t_o$ are so controlled that at the end of the time $t_o$ the index $n$ has assumed the required value $n_o = n(E_o, t_o)$ at the point to be sensitized, and on the other hand, if necessary, the amplitudes $E_o$ and $E'_o$ ($E'_o$ being fixed by the construction, when $E_o$ is fixed) so that the variation in index at said adjacent points is negligible in comparison with that obtained at the point sensitized. Of course, if the cell is made up of electrically independent points, the second control step is pointless, since in that case the presence of the field $E_o$ at one point does not cause the presence of a field at the adjacent points.

The decrease in the index $n$ as a function of time being very slow, $n$ maintains substantially the value $n_o$ for an adequate time. However, a very low "holding" voltage level can always be applied if needed.

If it is required to vary the index around a predetermined value, according to the invention either the duration $t_o$ of the energizing square wave can be varied while leaving the amplitude of the electric field constant, or said amplitude can be varied, leaving its duration of application constant.

Formula (2) enables the variation $\epsilon = \Delta n_2 - n_{\infty}$ in the index of the liquid crystal subjected to the field $E'_o$ to be compared with the variation $\Delta n_1 - \Delta n_\infty \approx \Delta n_1$ at the point subjected to the field $E_o$; we find:

$$\text{Log} \frac{\Delta n_1}{\Delta n_\infty} = \left(\frac{E_1}{E_2}\right)^2 \text{Log} \frac{\Delta n_2}{\Delta n_\infty}$$

For instance, if $\Delta n_1 = 0.05$ and $\Delta n_\infty = 0.002$, by taking $E_o/E'_o = 2$, we find $\epsilon = 0.0025$, which is of the order of 5% of $\Delta n_1$. By taking $E_o/E'_o = 3$ under the same conditions, we find $\epsilon = 0.00086$, — i.e., 1.7% of the value $\Delta n_1$.

The difference between the index of the liquid crystal at the point sensitized and at the adjacent points can be further accentuated if, to read out the index of the sensitized point, use is made of optical devices such as an analyzer and polarizer disposed on either side of the liquid crystal cell and enabling a difference in index $\Delta n$ for a thickness $d$ to be converted into a light intensity proportional to $\sin^2(\pi \Delta n d/\lambda)$. The contrast between two points energized by the fields $E_o$ and $E'_o$ respectively is then proportional to $$\frac{1}{\sin^2(\pi\epsilon/2 \, \Delta n_1)},$$

giving a contrast equal to 170 in the first numerical application and 1500 in the second.

Figure 8:
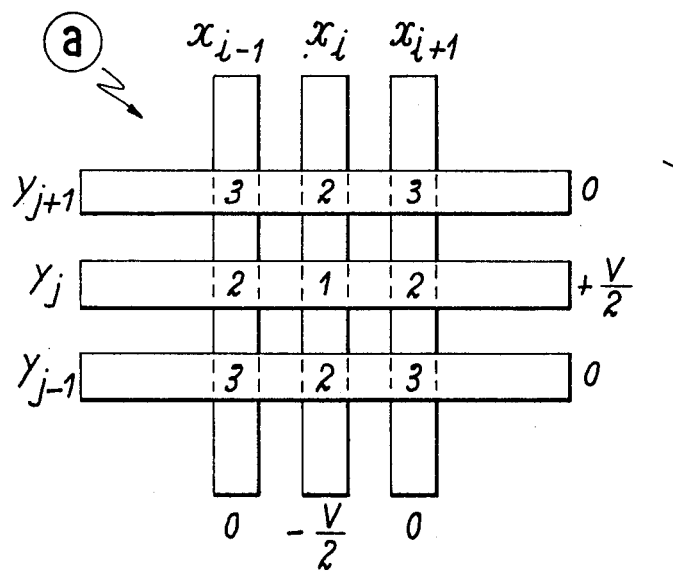
FIGS. 8a and 8b illustrate two possible ways of energizing a point of a cell with crossed strips.
Figure 8:
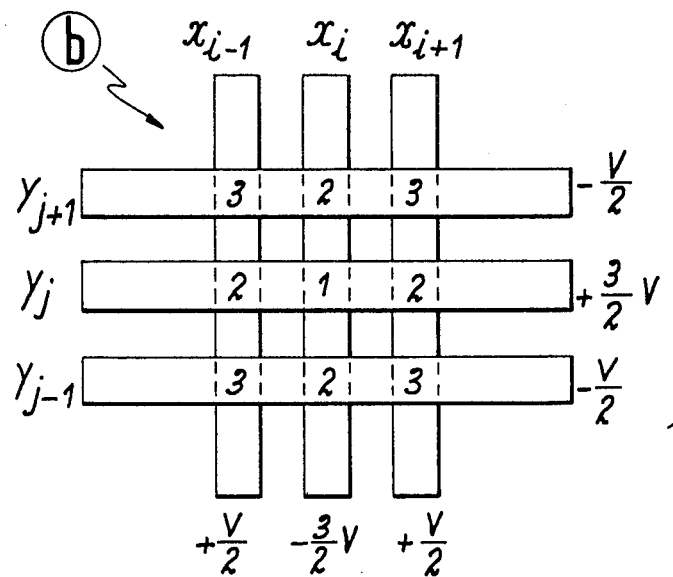

FIG. 8 illustrates two possible ways of energizing a point in a cell which minimize the energization of the adjacent points, in cases in which the liquid crystal cell is of the crossed strip type. The strips of one of the systems still have the reference $x_i$ and those of the other system $y_j$; a point such as that denoted by the reference 1 is defined by the overlapping of the strips $x_i$ and $y_j$; the points adjacent to 1 have the references 2 and 3. The simplest method of controlling the index of the liquid crystal at the point 1 consists in bringing the strip $y_j$ to the potential $V/2$ and the strip $x_i$ to the potential $-V/2$, all the other strips being earthed (FIG. 8a); the difference in potential between the electrodes of point 1 is therefore V, corresponding to an electric field $E_o$; the adjacent points 2 are subjected to differences in half potential corresponding to an electric field $$E'_o = \frac{E_o}{2};$$

the points 3, and also those not shown in the drawing, are not subjected to any electric field.

If a larger contrast is required between the sensitive point 1 and the adjacent points, use can be made of the method illustrated in FIG. 8b. The point 1 to be sensitized is energized via strips $x_i$ and $y_j$ respectively brought to the potentials $-2V/2$ and $+3V/2$; the other strips $x$ are brought to the potential $+V/2$ and the other strips $y$ to the potential $-V/2$. The point 1 is then subjected to a voltage of 3 V, causing an electric field of amplitude $E_o$; the points 2 and 3, and also the other points which are not shown, are subjected to voltages V, corresponding to an electric field $E'_o$ three times weaker than at the sensitized point. As stated hereinbefore, the energizing method shown in FIG. 8b leads therefore to a stronger contrast than the method illustrated in FIG. 8a.

In the prior art crossed strip devices, the voltage applied between the electrodes and the point to be sensitized could not exceed three times the threshold voltage $V_s$ of the phenomenon used, since the quasi-static voltage applied between the electrodes at a point which is not to be sensitized must not exceed the threshold voltage $V_s$, and this, in the most favourable instance (corresponding to FIG. 8b) authorizes a voltage equal to 3 $V_s$ at the point to be sensitized. By applying the control method according to the invention, at the point to be sensitized a voltage can be applied which is very much higher than three times the threshold voltage, since according to the invention use is made not of the properties of the liquid crystal in quasi-static conditions, but of its transitory behaviour.

Figure 9:
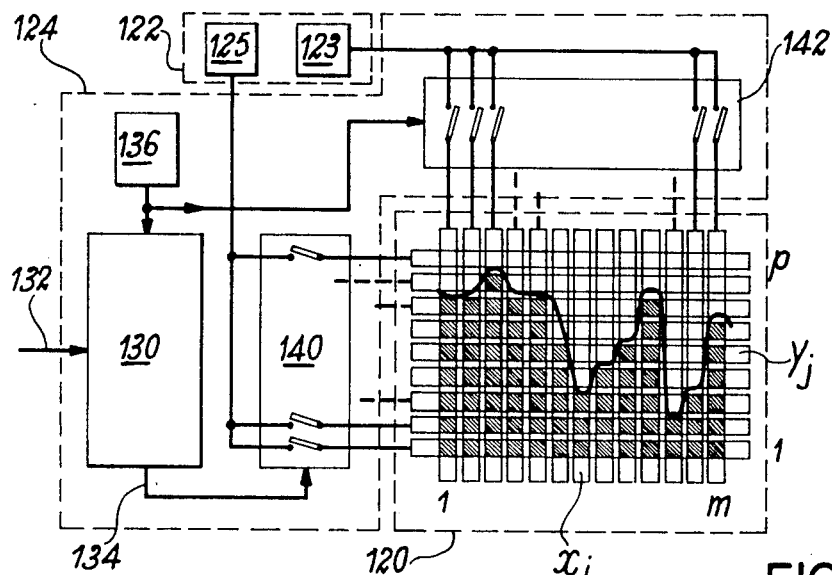
FIG. 9 is a diagram of a liquid crystal image-forming means.

By using on the one hand the speed of control of an optical characteristic of a liquid crystal according to the method described hereinbefore, and on the other the properties of remanence of said liquid crystal, an image-forming means can be produced with $m$ columns and $p$ lines whose points $mp$ can be energized sequentially. An image-forming means of the kind specified is shown in FIG. 9. FIG. 9 shows an imageforming means comprising a liquid crystal cell 120 (represented solely by its crossed strips), electrical means 122 and an address device 124. The cell 122 comprises two systems of electrodes one formed by strips $m$ having the references $x_i$, $1 \leq i \leq m$ and the other by strips $p$ having the references $y_j$, $1 \leq j \leq p$. The electrical means 122 comprise a source 125 of effective voltage V/2 and a source 123 of the same effective voltage but of apposite phase ot the source 125, such voltage being referred to hereinafter as the $-$V/2 voltage source. The address device 124 comprises on the one hand a numerical sampling circuit 130 which receives at its input 132 a physical magnitude Y (t) of variable amplitude and supplies at its output 134 the series of numerical values J of the successive samples of Y (t); sampling is controlled by a clock 136 which fixes the frequency of sampling; the characteristics of the converter 130 are such that the maximum value J does not exceed the number $p$ of strips $y_j$; the address device also comprises a sequential address circuit formed by two switching members 140, 142; the circuit 142, which is controlled by the clock 136, successively connects the strips $x_i$ to the source 123 of voltage $-$V/2 for a duration $t_0$; the advance of the rank of the connected strip is controlled by the clock 136; for the duration $t_0$ the member 140 connects the J first strips $y_j$ to the source 125 of voltage $+$V/2. In this variant embodiment of the image-forming means, the first points J of a column are therefore sensitized by a voltage V present for the duration $t_0$, while the other points p-J of the same column are subjected only to a half voltage V/2; each sample of the physical magnitude of amplitude Y is therefore represented by a sensitized portion of a column. Sequential scanning column by column is given its cadence by the clock 136 which also controls sampling, so that each sample is associated with one column. Due to the relevance of the cell, bound up with the de-energizing time of the liquid crystal, the image is obtained of a "section" of the physical magnitude whose design is formed by the curve separating the sensitized and non-sensitized zones of the cell. In this sense, the imaging means can be called linear and digital. The number of strips in the inage-forming means is determined as a function of the energizing speed of one point and by the memory time of the liquid crystal used.

The image-forming means can also be used for recording an optical memory; in that case the image detected is no longer that of a function, but a juxtaposition of black or white points representing 0 and 1. The matrix $x_iy_j$ is written in sequentially, such writing-in being regenerated during the whole time of its storage.

Very advantageously the effective voltage V/2 of the sources 123 and 125 is so adjusted that the variation in index obtained after the application of the voltages $\pm$V/2 for the duration $t_0$ corresponds to a variation in optical path in the liquid crystal film equal to half the wavelength of the radiation used to analyze the cell. The cell is then placed between a polarizer and an analyzer of parallel directions and observed by transmission; the inside of the front curve appears black, thus accentuating the contrast between the two zones and making reading-out very convenient.

It should be noted that in this image-forming means each elementary liquid crystal cell, formed at the crossing of a strip $x_i$ and a strip $y_j$, functions between two levels of minimum and maximum opacity.

Figure 10:
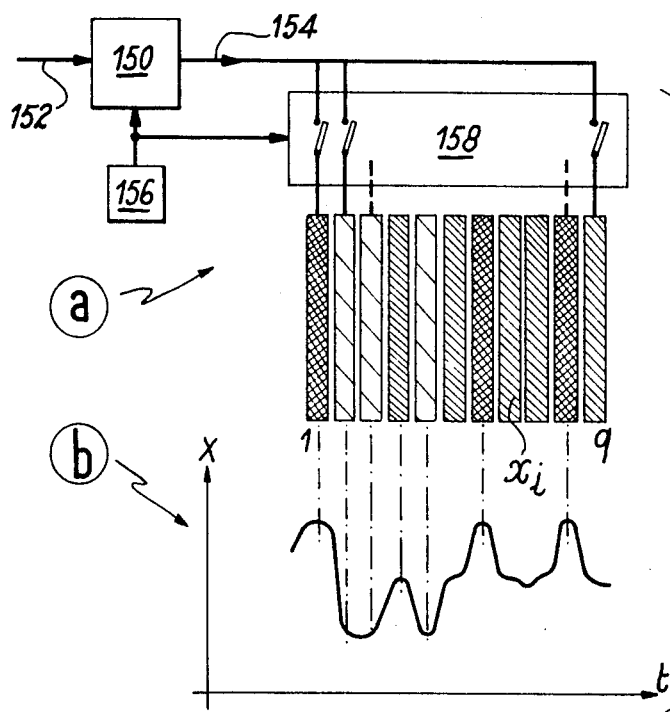
FIG. 10 is a diagram of a liquid crystal image-forming means of similar type.

Another advanategous embodiment of an imageforming means according to the invention is shown in FIG. 10. In this image-forming means the semi-transparent conductive strips forming the systems of electrodes of the cell are parallel with one another and define a plurality of strips of points. FIG. 10 shows only one of the systems of electrodes in the form of strips $q$ having the references $x_i$, $1 \leq i \leq q$; the electrical means of the image-forming means comprise a converting and sampling circuit 150 which receives at its input 152 a physical magnitude of variable amplitude X (t) and supplies at its output 154 the successive samples of such magnitude, in the form of an alternating voltage of effective value $V_i$; the sampling is controlled by clock 156. The address device comprises mainly a switching circuit 158 which addresses sequentially and for the duration $t_o$ the voltage $V_i$ appearing at the output 150 of the converter (or for the duration $t_i$ of the identical voltages $V_o$) to the strips $x_i$ of one of two systems of electrodes, the strips of the other system being, for instance, earthed. The sequential addressing is controlled by the clock 156 which also produces the cadence of sampling, so that each sample $V_i$ is associated with the corresponding strip $X_i$. Use of the remanence cf the energization enables a section of the physical magnitude analyzed to be represented analogically.

In an advantageous variant embodiment, the system of electrodes whose strips are permanently earthed can take the form of a single uniform semi-transparent conductive layer.

If the cell of the imaging means shown in FIG. 10 is illuminated by a ray of polarized light parallel with the strips, such radiation undergoes dephasing as it passes through the zones of the liquid crystal subjected to an electric field; the dephasing $\Delta\phi$ is a function of the variation in index $\Delta n$ caused by the application of the electric field:

$$\Delta = 2\pi\Delta \; nd/\lambda$$

where $d$ is the thickness of the liquid crystal layer, $\lambda$ the wavelength of the radiation used and $\Delta n = n_2 - n_1$, $n_1$ being the starting index of the medium and $n_2$ the index induced by the electro-optical effect. $\Delta\phi$ can be considerable nunmber of time $\pi$. The duration $t_o$ and the converting circuit 150 can be so controlled that the dephasing $\Delta\phi$ is proportional to the amplitude X of the physical magnitude analyzed; in that case the image-forming means is a phase image-forming means, which can be used for recording data in optical signal processing systems. The duration $t_o$ and the amplitudes $V_i$ can also be controlled, in another variant embodiment, so that the cell placed between a polarizer and analyzer of parallel directions will give an analog image of the signal X (t) in which the blackening is proportional to the amplitude X; this blackening is shown diagrammatically on the strips in FIG. 10a and corresponds to the amplitude X whose variations in time are shown in FIG. 10b.

The image-forming means described hereinbefore, which use index modulation, can of course operate under diffusion conditions on condition that direct voltages or frequencies lower than the relaxation frequency of the ions are taken as the voltage V. They do not require any polarizer-analyzer assembly for their light output.

The control method according to the invention is clearly applicable to liquid crystal cells in which all the points are not energized independently, for instance, in which the electrodes are two uniform transparent deposits each connected to a suitable potential.

This is the case, for instance, with cells used in phase modulation for addressing by light beams (U.S. Pat. application Ser. No. 245,238 filed Apr. 18, 1972 and Divisional Application filed Feb. 14, 1973, by the Applicant's) or as a colour filter.

One very advantageous application is to colour television, in accordance with U.S. Pat. application Ser. No. 337,075 filed Mar. 1, 1973 by Borel et al. the limitations of response speed mentioned in such application can readily be obviated without reducing the thickness of the liquid crystal layer by applying according to the invention pulses of relatively high voltage and of predefined duration. Instead of, as shown in FIG. 4a of that application, applying a voltage varying in steps and taking the successive values $V_R$, $V_B$ and $V_V$, a voltage $V_o$ for instance, is applied which is very much higher for brief times $T_R$, $T_B$ and $T_V$, returning to zero between such pulses.

By way of example, the liquid crystal image-forming means according to the invention can be formed by a layer of a few microns of MBBA disposed between two glass plates spaced out by mylar wedges; the transparent conductive electrodes can be produced in indium oxide or tin oxide by photogravure on the facing inside surfaces of the plates. The plates can birst be rubbed over a privileged axis, thus inducing a preferential direction in which the MBBA molecules are laid. The result is an optically active medium whose birefringency is very considerable: maximum $\Delta n$ of the order of 0.20 at $\lambda = 6328$ A and at 22° C. The number of points can be of th order of 1024 (32 crossed strips). For operation in diffusion the duration $t_o$ can be of the order of 1 millisecond; for operation in index modulation the voltages can have a frequency of the order of 10 kHz and duration $t_o$ of the order of a fraction of a millisecond. In the latter case the image-forming means is therefore 10 times more rapid than in the former.

We claim:

1. A method of controlling the optical index of the points of a liquid crystal layer to a desired value $n_0$, said layer comprising a plurality of points, with an electric field, the application of an electric field of amplitude $E_0$ at a point causing the appearance of an electric field of amplitude $E'_0$ at some of the adjacent points, comprising the steps of:

determining the transitory response $n(E,t)$ of the liquid crystal index $n$ at an electric field of amplitude $E, t$ being the duration of application of said electric field, selecting a pair of values $E_0$ and $t_0$ from said transitory response so that the index $n(E_0, t_0)$ at said point obtained after the application of an electric field of amplitude $E_0$ for a duration $t_0$ is equal to a desired value $n_0$, and so that the index $n(E'_0, t_0)$ at said adjacent points obtained under the influence of the electric field of amplitude $E'_0$ for said duration $t_0$ differs only slightly from the index value before the electric field is applied and applying to said liquid crystal at said points, said electrical field of amplitude $E_0$ for a duration $t_0$, to obtained said desired value $n_0$ at said points and to maintain unchanged the optical index at said adjacent points.

2. A method as set forth in claim 1, characterized in that the optical index of the points of said plurality is controlled sequentially, the time taken for controlling all the points being less than the time needed for said index of the liquid crystal to resume its value at rest after the electric field has ceased to be applied.

* * * * *